United States Patent [19]

Aaltonen et al.

[11] 4,319,023

[45] Mar. 9, 1982

[54] PROCESS FOR PRODUCING REGENERATED CELLULOSIC ARTICLES AND FOR RECOVERING THE SOLVENT CHEMICALS

[75] Inventors: Olli Aaltonen; Martti Alkio, both of Espoo, Finland

[73] Assignee: Technical Research Centre of Finland, Espoo, Finland

[21] Appl. No.: 245,195

[22] Filed: Mar. 18, 1981

[30] Foreign Application Priority Data

Mar. 28, 1980 [FI] Finland .................................. 800962

[51] Int. Cl.³ .......................................... C08B 00/00
[52] U.S. Cl. .................................... 536/57; 106/168; 264/187; 536/56
[58] Field of Search ................... 536/57, 56; 106/168; 264/187

[56] References Cited

U.S. PATENT DOCUMENTS

| | | | |
|---|---|---|---|
| 4,017,642 | 4/1977 | Orth et al. ............................. | 536/56 |
| 4,022,631 | 5/1977 | Turbak et al. ....................... | 106/168 |
| 4,073,660 | 2/1978 | Portnoy et al. ..................... | 106/168 |
| 4,082,617 | 4/1978 | Portnoy et al. ..................... | 106/168 |
| 4,097,666 | 6/1978 | Johnson et al. ..................... | 536/57 |
| 4,173,613 | 11/1979 | Rodier ................................. | 264/187 |
| 4,281,063 | 7/1981 | Tsao et al. ........................... | 536/56 |

Primary Examiner—Ronald W. Griffin
Attorney, Agent, or Firm—Bucknam and Archer

[57] ABSTRACT

A process for producing regenerated cellulosic articles from cellulose which has been dissolved in a mixture of dimethyl sulfoxide (DMSO) and formaldehyde, and for recovering the solvent chemicals. The DMSO/formaldehyde solution of cellulose is brought into contact with an aqueous solution, the pH of which is at least 9 and the adjustment of pH has been carried out by means of a base or an alkaline salt which does not react with formaldehyde and the content of which is at most 0.1% by weight, so that the product is coagulated and regenerated in the desired form, such as fibres, films or shaped articles. The coagulation solution is evaporated in one stage or plurality of stages so that the DMSO and formaldehyde of the cellulose solution remain in the evaporation residue. The evaporation residue is recycled for the production of cellulose solution, purified, if so required.

3 Claims, 1 Drawing Figure

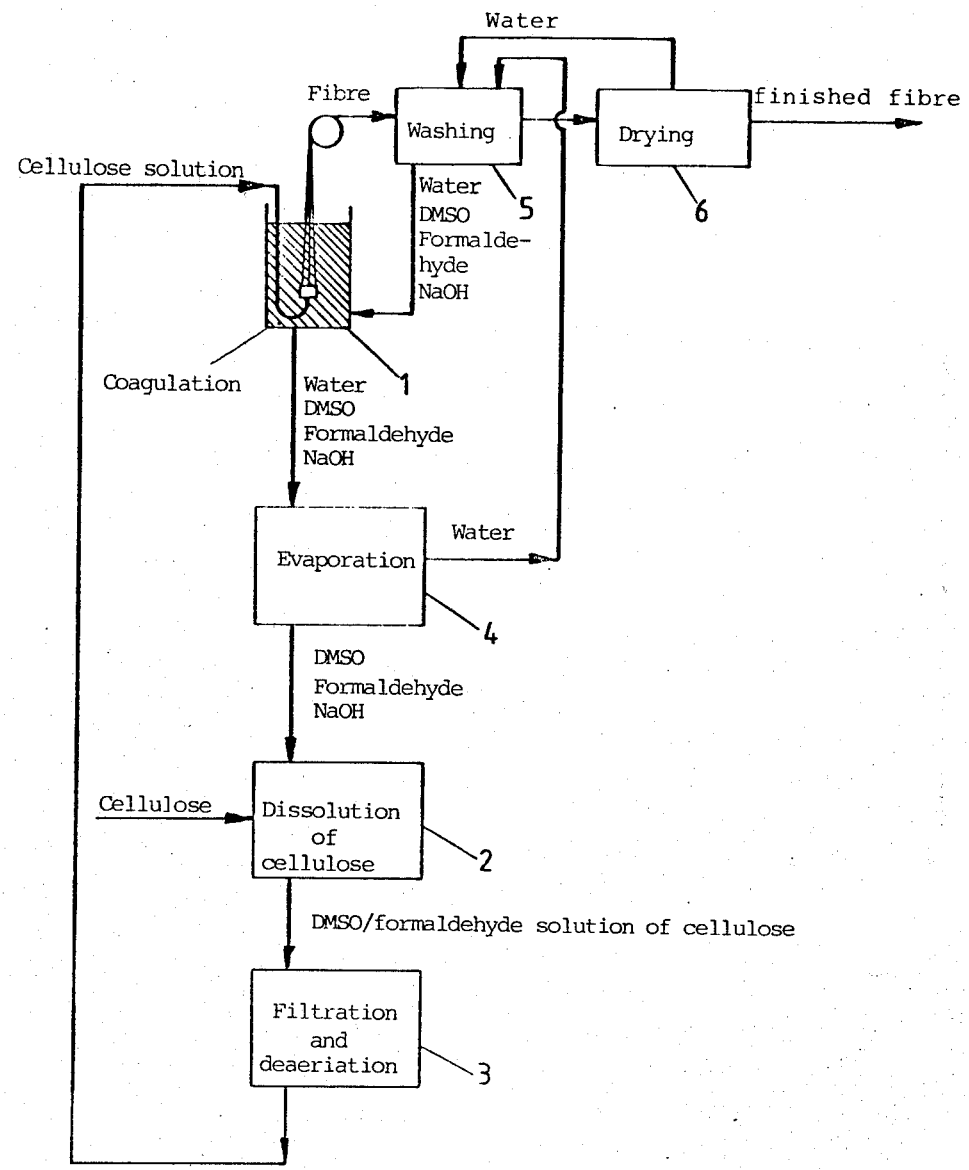

PROCESS FOR PRODUCING REGENERATED CELLULOSIC ARTICLES AND FOR RECOVERING THE SOLVENT CHEMICALS

The present invention relates to a process to produce regenerated cellulosic articles from cellulose which has been dissolved in a mixture of dimethyl sulfoxide and formaldehyde or paraformaldehyde and to recover the solvent chemicals.

According to a known process (U.S. Pat. No. 4,097,666) different cellulose pulps such as cotton linters, dissolving pulps or paper-grade pulps can be dissolved in a mixture of dimethyl sulfoxide (DMSO) and paraformaldehyde (PF) or formaldehyde at the temperature of 120° C.–130° C. After cooling, the solutions are very stable and may contain over 10% of dissolved cellulose. Cellulose can be regenerated from the solution by bringing the solution in contact with water or short chain alcohol. The method enables the production of cellulosic fibres, films or shaped articles.

Yet it has been found (see e.g. MacDonald, D.M., A.C.S. Symp. Ser. 58, p. 25 to 39) that the regeneration of cellulose in water alone is too slow for the industrial scale manufacture of fibres.

In order to accelerate the regeneration of cellulose, the use of various additives in the coagulation bath which react chemically with the formaldehyde bonded to cellulose and thus cause rapid regeneration of cellulose from the solution, has been suggested (German Patent Application No. 26 21 166). Among these substances are e.g. ammonia, ammonium salts, sodium sulfide, sodium sulfite and some amines. These additives have, however, a serious disadvantage, as the formaldehyde reacts with them and forms a permanent compound, which cannot be returned simply to the dissolving stage of cellulose. If the bonded cellulose is lost, it is not commercially possible to produce e.g. fibres. This problem has not been solved yet, according to the literature.

It is also been suggested that the preferable coagulation bath would be an aqueous solution containing 1–5% NaOH or 20% $Na_2CO_3$ (French Patent Application No. 78 10144 and MacDonald).

The recovery of the solvent chemicals of cellulose from the coagulating bath is carried out advantageously so that the coagulating bath is evaporated or distilled in one stage or multiple stages under reduced pressure. Dimethyl sulfoxide and formaldehyde remain in the evaporation residue or evaporation residues which is-/are reused at the dissolution stage of cellulose.

Yet it has been found that when using said amounts of base or alkaline salts the formaldehyde does not remain in the evaporation residue, but is lost along with the distillate, which prevents the commerical utilization of one-stage evaporation as a process for recovering chemicals. In addition, the evaporation residue changes turbid and separates into two phases: aqueous NaOH and aqueous DMSO (so-called saltingout). This prevents the use of evaporation residues at the dissolution stage of cellulose also in such multi-stage evaporations in which the formaldehyde removed from the first evaporation stage along with the distillate is recovered in subsequent evaporation stages. These factors make the use of known methods impossible in practical processes.

On the other hand, it has been found that the regeneration rate of cellulose does not depend on the nucleophilic compounds (ammonia etc.) added to the bath and reacting with the formaldehyde, but the pH of the bath is the factor determining the rate of the regeneration. The pH of the bath has to be greater than 9, no matter how this value has been obtained.

The nucleophilic compounds reacting with the formaldehyde are, indeed basic, but if the adjustment of pH is carried out by a so-called strong base, e.g. NaOH, KOH or $Ca(OH)_2$ or an alkaline salt such as $Na_2CO_3$ or $K_2CO_3$, the amounts needed are only about some parts per million of the total amount of the bath. A base or salt amount that small does not interfere with the distillation of the bath.

In the process according to the invention, in producing regenerated cellulosic articles such as fibres, films or shaped articles, the DMSO/formaldehyde solution of cellulose is brought into contact with such an aqueous solution, the pH of which has been raised at least to the value of 9 by means of an alkaline salt or a strong base which does not react with formaldehyde. The content of strong base or alkaline salt in the coagulating bath is at most 0.1%, preferably 0.01%, or when the the DMSO content of the coagulation solution is low, only 0.001%. The coagulation solution is evaporated or distilled in one or in a plurality of stages under reduced pressure, so that DMSO, formaldehyde and the base or alkaline salt remain in the evaporation residue/s which is/are, after eventual purification, reused at the dissolution stage of cellulose.

The invention has the following advantages over the known processes:

1. The regeneration rate of cellulose is essentially increased by increasing the pH of the coagulation solution at least to the value of 9, so that practical fibre or film production becomes possible. As it is economically advantageous for the process to keep the DMSO content of the coagulation solution as high as possible (the amount of water to be evaporated is then at its minimum), the increase of the pH of the coagulation solution brings along an important advantage, as its DMSO content can be as high as 80% without the sticking together of the filaments occurring at a lower pH value.

2. The difficulties in returning the formaldehyde to the dissolution stage of cellulose caused by the substances binding the formaldehyde, or the economically unbearable loss of paraformaldehyde along with the byproducts are avoided.

3. By using very small amounts of base or alkaline salts in the coagulation solution, the solvent chemicals of the cellulose can be recovered by one-stage or multistage vacuum evaporation. Thus the division of the evaporation residues into turbid phases which cannot be used in the dissolution of cellulose, caused by the use of big amounts (over 1%) of base or salt, is avoided.

The invention will now be described in more detail with reference to the accompanying drawing which shows a block diagram of the production of regenerated cellulose fibre according to the process of the invention.

In the embodiment shown in the diagram, a small amount of sodium hydroxide (NaOH) is used for adjusting the pH of the bath at the coagulation stage 1. The DMSO/formaldehyde solution of cellulose, obtained from the dissolution stage 2, is passed through the filtering and deaeration stage 3 to the coagulation stage 1, in which the solution is spun into fibres in a coagulation bath, which contains, in addition to water, also DMSO, formaldehyde and NaOH. The solution which is discharged from the coagulation stage is passed to the evaporation stage 4, in which the chemicals are separated. The separated chemicals are passed to the dissolution stage for reuse. The water obtained from the evaporation stage is passed to the washing stage 5, in which the fibres are washed. After washing, the fibres are taken to the drying stage 6. The liquid leaving the washing stage is passed to the coagulating stage.

The advantages of the process according to the invention are illustrated in the following examples.

EXAMPLE 1.

Preparation of cellulose solution 83 g air dry, prehydrolyzed birch sulphate pulp, $DP_V=380$, 83 g of technical-grade paraformaldehyde and 1100 g of dimethyl sulfoxide were heated in a 2000 ml glass vessel to 120° C. in about 1.5 h. The obtained clear solution was still kept at 120° C. for 2.5 more hours to extract the excess formaldehyde. The hot solution was filtrated through a nylon cloth. The viscosity of the solution was 165 P at 20° C. and the formaldehyde/cellulose molar ratio was 1.2.

EXAMPLE 2

Spinning of cellulose solution into water

A cellulose solution prepared as described in Example 1 was fed by a gear pump through spinnerette into water, the pH of which was 7.5. There were 200 orifices in the nozzle, each having a diameter of 0.08 mm. The fibre bundle coming up from the spinnerette, partly regenerated, was passed vertically for 200 mm through the coagulation bath and further to a spinning godet, whose periheral speed was 20 m/min. The fibre bundle was very swollen and weak and did not endure stretching. The filaments tended to stick together.

EXAMPLE 3

Spinning of cellulose into alkaline water

A cellulose solution prepared as described in Example 1 was spun into fibres by the equipment represented in Example 2 and with water as the coagulation bath. 0.0004% of NaOH was added to the water. The pH of the solution was 9.5. The fibre bundle coming from the nozzle was stretched 16% between two godets rotating at different speeds, washed and dried.

EXAMPLE 4

Spinning of cellulose solution into $Na_2CO_3$/water mixture

A cellulose solution prepared as described in Example 1 was spun into fibres by using a coagulation bath consisting of 45% DMSO, 0.0001% NaOH and water. The pH of the soluton was 10.3. The fibre bundle was stretched 16%, washed and dried.

EXAMPLE 6

Film forming into water

A cellulose solution prepared as described in Example 1 was spread on a glass plate by a small film casting machine. The glass plate was submerged for 30 seconds into water, the pH of which was 7.2. The cellulose solution had regenerated only on its surface and the film could not be removed from the glass plate without breaking it.

EXAMPLE 7

Film forming into alkaline water

The glass plate, covered as described in Example 6, was submerged for 30 seconds into water, to which 0.001% of NaOH was added. The pH of the solution was 10.2. The film could be removed from the glass plate in one piece, and it could be washed and dried.

EXAMPLES 8, 9, 10, 11 and 12

Recovery of solvent chemicals from the coagulation solution

The coagulation solution used in Examples 8 and 9 have been described in known processes. The coagulaton solutions used in Examples 10, 11, and 12 are according to our invention. The recovery tests have been carried out by a laboratory evaporator (Rotavapor) in the form of batch evaporation. The results are presented in the following table.

| Example | 8 | 9 | 10 | 11 | 12 |
| --- | --- | --- | --- | --- | --- |
| Composition of the coagulation bath to be evaporated | | | | | |
| $H_2O$ % | 89.0 | 87.8 | 89.8 | 89.5 | 89.6 |
| DMSO % | 9.7 | 9.9 | 9.8 | 10.2 | 10.1 |
| $CH_2O$ % | 0.4 | 0.4 | 0.4 | 0.4 | 0.4 |
| NaOH % | 1.0 | 2.0 | 0.01 | 0.001 | 0.0002 |
| Pressure, mmHg | 12 | 12 | 12 | 12 | 10 |
| Vapour temperature at the end of the evaporation, °C. | 40 | 45 | 42 | 42 | 37 |
| $CH_2O$ division: residue/distillate | — | — | 0.3 | 1.3 | 4.7 |
| Evaporation residue: DMSO content % | 75 | 83 | 98 | 93 | 99 |
| $CH_2O$ yield % | 1 | 1 | 11 | 41 | 83 |
| Residue | turbid 2-phase | turbid 2-phase | clear | clear | clear |

The examples show how unfavourably the unnecessary NaOH-excess affects the recovery of the DMSO and formaldehyde from the coagulation bath.

EXAMPLE 13

Reuse of chemicals in the dissolution stage of cellulose

The evaporation residue obtained in Example 11 was cooled to 0° C., at which temperature part of it crystallized. The liquid part was poured away. The crystallized part was allowed to warm up, whereby it melted. To 250 g of the molten liquid 17.5 g paraformaldehyde and 14 g air-dry cellulose were added. The mixture was treated as in Example 1, whereby it yielded a clear viscous solution.

EXAMPLE 14

Spinning of cellulose into water/DMSO/NaOH solution

A cellulose solution prepared as described in Example 1 was spun into fibres by using a coagulation bath consisting of 80% DMSO, 0.1% NaOH and formaldehyde-containing water. (Formaldehyde is transmitted to the coagulation bath along with the stream of cellulose solution). The pH of the coagulation bath was over 14. The fibre bundle was stretched 25%, washed and dried. The filaments of the fibre bundle did not stick to each other.

EXAMPLE 15

Recovery of chemicals from the coagulation bath by two-stage evaporation

The coagulation bath used in Example 14 was evaporated in two stages by using packed columns. In the first stage, coagulation bath was continuously fed to the top of the column. The pressure at the column top was 96 mmHg. Evaporation residue consisting of DMSO, NaOH, 0.17% formaldehyde and 0.2% water, was removed continuously from the reboiler provided with a steam heating coil. The evaporation residue was clear and could be used as such in the dissolution of new cellulose.

The vapour obtained from the top of the packed column was condensed to form a water solution containing about 8% formaldehyde, which was passed continuously to another packed column. The pressure prevailing in the other column was about 200 mmHg and the temprature in the reboiler was about 70° C. The evaporation residue removed from the reboiler contained about 70% formaldehyde, which polymerized rapidly as the solution cooled. The evaporation residue was dried, whereby solid paraformaldehyde was obtained for dissolving new cellulose, together with the evaporation residue (DMSO) obtained from the first column.

What is claimed is:

1. A process for producing regenerated cellulosic articles from cellulose which has been dissolved in a mixture of dimethyl sulfoxide and formaldehyde or paraformaldehyde, and for recovering the solvent chemicals, characterized in that (a) the cellulose solution is brought into contact with an aqueous solution, the pH of which is at least 9 and the adjustment of pH has been carried out by means of a strong base or an alkaline salt which does not react with formaldehyde and the content of which in the coagulation solution is not more than 0.1% by weight, so that the product is coagulated and regenerated in the desired form, such as fibres, films or shaped articles, (b) the coagulation solution is evaporated in one stage or plurality of stages so that the dimethyl sulfoxide and the formaldehyde of the cellulose remain in the evaporation residue/s and (c) the evaporation residue/s is/are recycled for the production of cellulose solution, purified, if so required.

2. A process in accordance with claim 1, characterized in that the content of the strong base or alkaline salt is about 0.01% by weight.

3. A process in accordance with claim 1, characterized in that the content of the strong base or alkaline salt is about 0.001% by weight.

* * * * *